United States Patent
Bassman et al.

[19]

[11] Patent Number: 6,131,131
[45] Date of Patent: Oct. 10, 2000

[54] COMPUTER SYSTEM INCLUDING AN ENHANCED COMMUNICATION INTERFACE FOR AN ACPI-COMPLIANT CONTROLLER

[75] Inventors: Robert Bassman; Anil Rao, both of Austin, Tex.

[73] Assignee: Dell U.S.A., L.P., Round Rock, Tex.

[21] Appl. No.: 09/012,434

[22] Filed: Jan. 22, 1998

[51] Int. Cl.[7] .............................. G06F 13/00; G06F 13/14
[52] U.S. Cl. ............................... 710/15; 710/33; 710/52; 710/57
[58] Field of Search ................................. 710/1, 15, 33, 710/52, 57

[56] References Cited

U.S. PATENT DOCUMENTS

| 4,507,781 | 3/1985 | Alvarez, III et al. | 370/104 |
| 5,598,581 | 1/1997 | Daines et al. | 395/872 |
| 5,664,116 | 9/1997 | Gaytan et al. | 395/200.64 |

OTHER PUBLICATIONS

Intel/Microsoft/Toshiba—"Advanced Configuration and Power Interface Specification", Revision 1.0, Dec. 22, 1996, Chapter 3, pp. 17–33.

Intel/Microsoft/Toshiba—"ACPI Implementers' Guide", Oct. 6, 1997, pp. 1–154.

Primary Examiner—Thomas C. Lee
Assistant Examiner—Rehana Perveen
Attorney, Agent, or Firm—Skjerven, Morrill, MacPherson, Franklin & Friel, LLP; Ken J. Koestner

[57] ABSTRACT

A conventional keyboard-style ACPI interface is greatly enhanced by the inclusion of a bi-directional hardware buffer and a special software protocol that allows multiple byte command and data messages to be sent in a burst fashion. The illustrative enhanced ACPI interface alleviates congestion in data transmission that results from the overhead incurred by transferring messages using multiple interrupts per message. An extended embedded controller includes a buffer for temporary storage of a plurality of data bytes and a program code for controlling data transfers to and from the buffer using a data handling technique that is ACPI-compliant.

27 Claims, 7 Drawing Sheets

ENHANCED INTERFACE

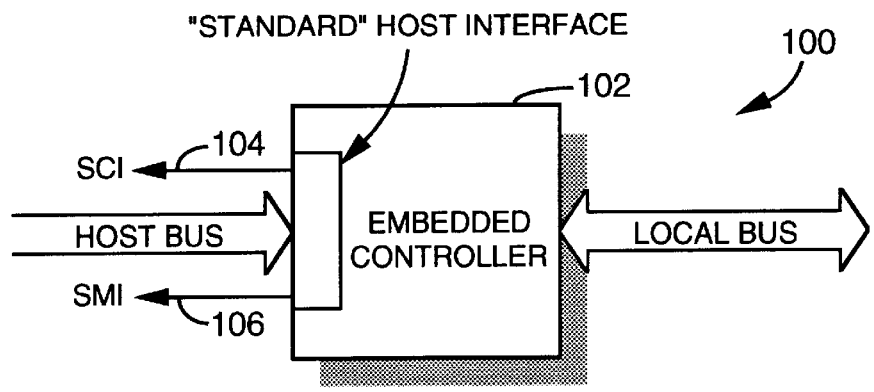
FIG. 1 STANDARD INTERFACE
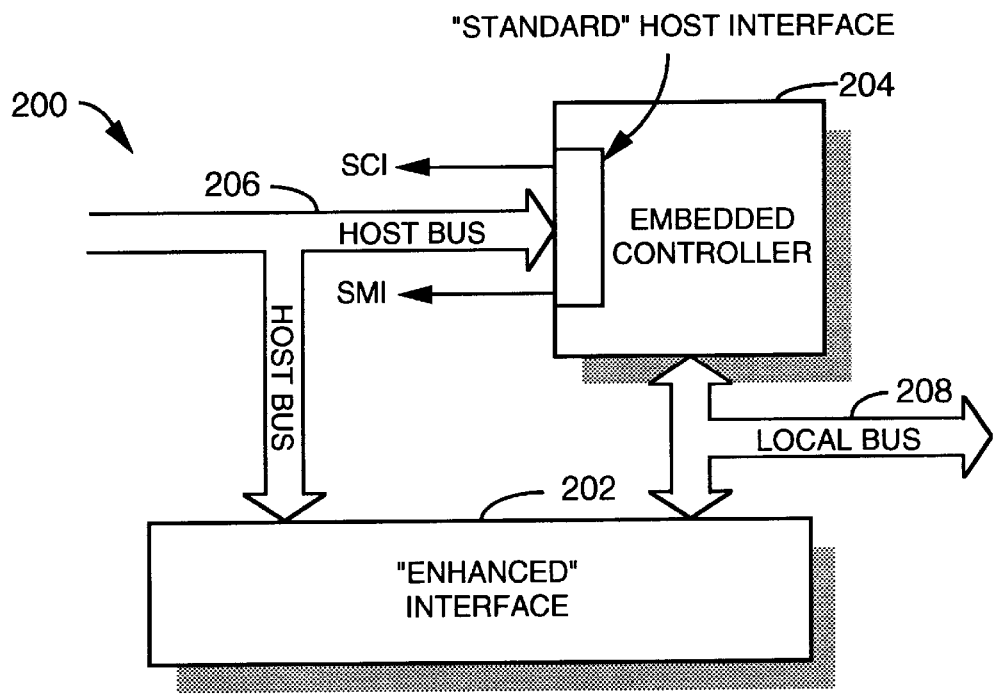
FIG. 2 ENHANCED INTERFACE

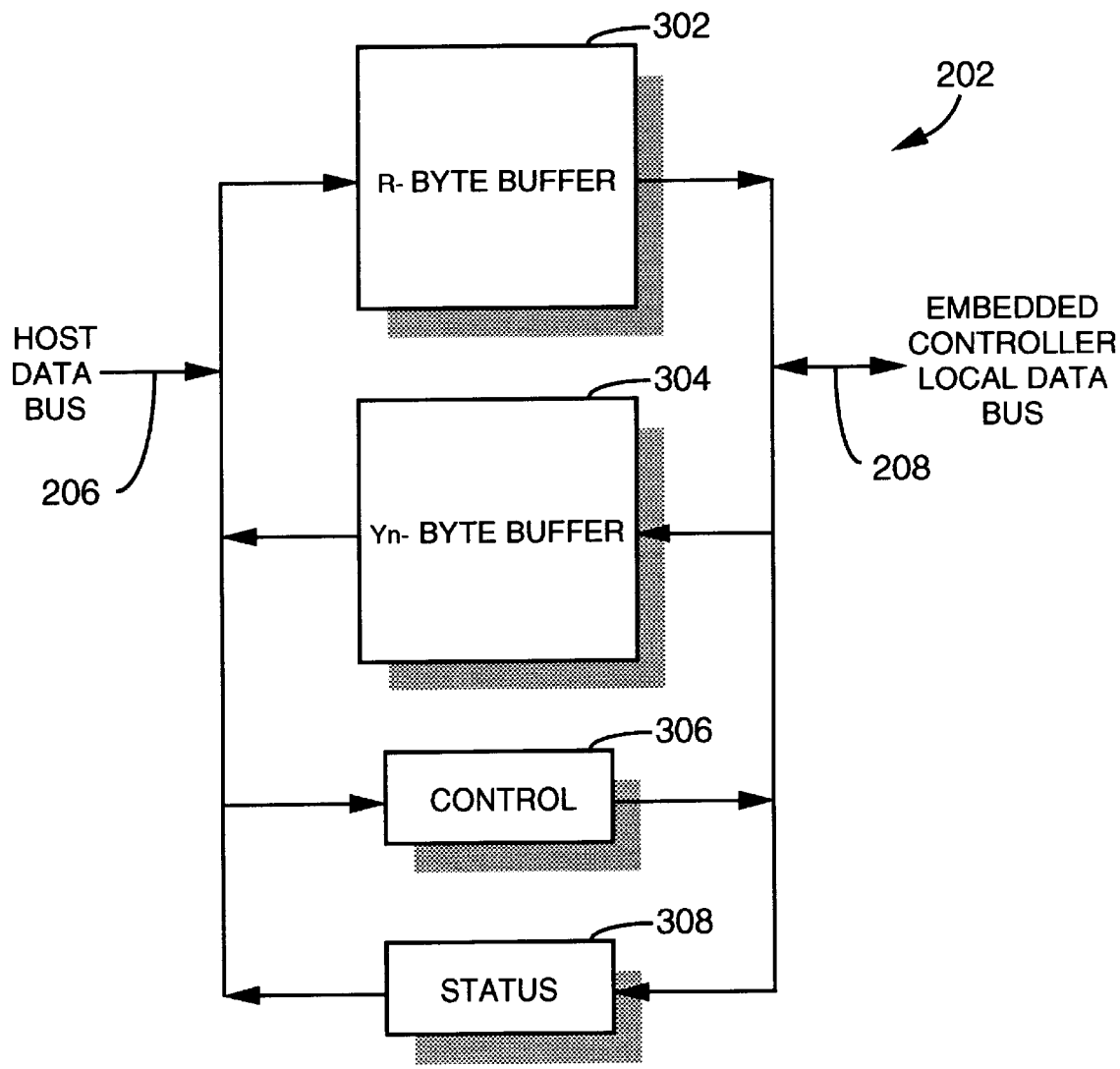
FIG. 3  ENHANCED INTERFACE INTERNAL ARCHITECTURE

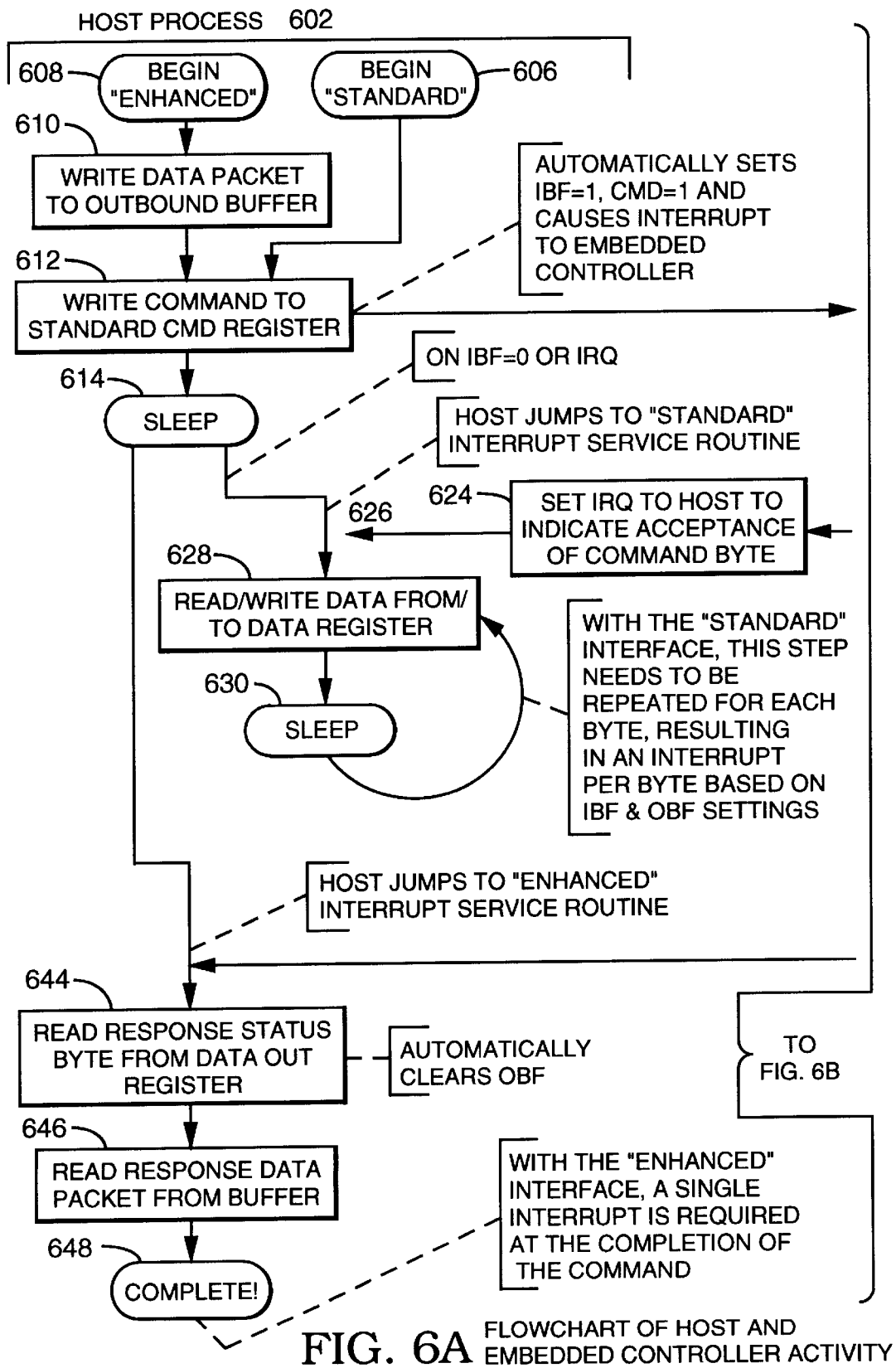
FIG. 6A FLOWCHART OF HOST AND EMBEDDED CONTROLLER ACTIVITY

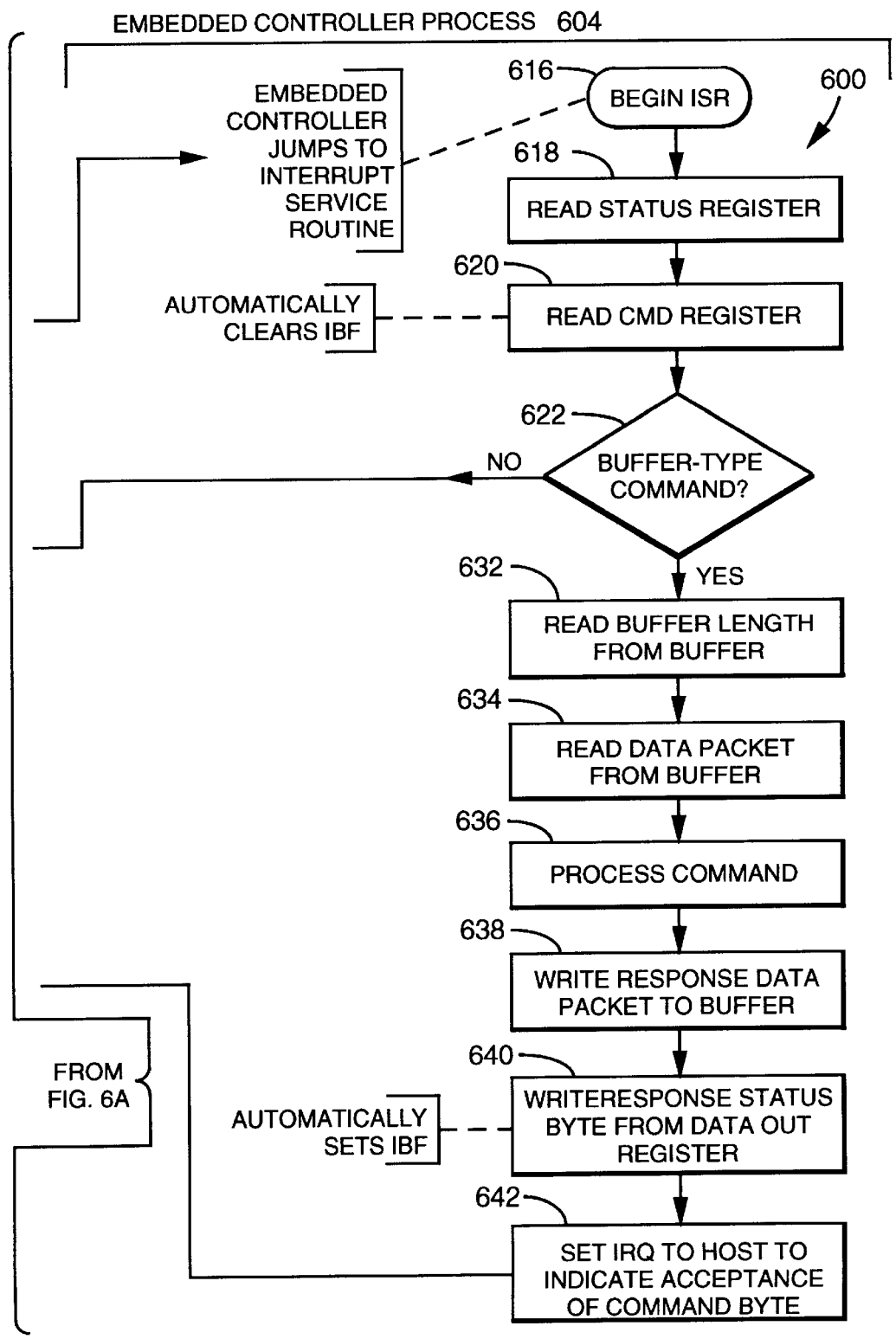
FIG. 6B  FLOWCHART OF HOST AND EMBEDDED CONTROLLER ACTIVITY (cont.)

COMPUTER SYSTEM INCLUDING AN ENHANCED COMMUNICATION INTERFACE FOR AN ACPI-COMPLIANT CONTROLLER

BACKGROUND OF THE INVENTION

1. Field of the Invention

The present invention relates to computers such as personal computers. More specifically, the present invention relates to interfaces and associated operating methods for system management of computer systems.

2. Description of the Related Art

Several software and hardware manufacturing companies in the computer industry, including Intel™, Microsoft™, and Toshibas™, have been leaders in the standardization of system management of personal computers (PCs). These standards are set forth to allow a next generation of Operating Systems to perform a more active role in the management of computer system functions including battery charge control, fan control, and the like. The standard is described in an Advanced Configuration and Power Interface (ACPI) specification, a key element in Operating System Directed Power Management (OSPM). The OSPM and the ACPI apply to all classes of computers, explicitly including desktop, mobile, home, and server computer systems.

The ACPI adapts existing power management software tools including BIOS code, APM APIs, PNPBIOS APIs, and the like into a well-defined power management and configuration system. The ACPI supports an orderly transition from existing (legacy) hardware to ACPI hardware, and allows legacy and ACPI hardware to coexist in a single computer and to become active when appropriate.

New system architectures are designed that stretch the limits of current Plug and Play interfaces. The ACPI adapts existing motherboard configuration interfaces to support these advanced architectures in a more robust, and potentially more efficient manner.

The ACPI-compatible hardware and software implementing operating system (OS) directed power management (OSPM) support include interfaces within a PC to manage the controls defined by the Advanced Power and Configuration Interface Specification (ACPI).

The ACPI specification outlines an interface to an embedded controller. The embedded controller described in the ACPI specification is programmed in a manner similar to the programming of a keyboard interface. A problem with the ACPI-specified embedded controller is that for advanced monitoring capabilities, which are typically utilized in servers, the interface is very slow and interrupt-intensive. The ACPI-compliant embedded controller utilizes approximately one interrupt for the transfer of a single byte.

The ACPI is a relatively new specification so that only fundamental constructs of the embedded controller have been developed. For example, battery management in an ACPI-compliant embedded controller has been implemented with an I$^2$C bus controller to communicate with the battery. The I$^2$C bus controller is available in an ISA bridge chip from Intel. Currently, the ACPI specification is primarily implemented in portable PC's.

Referring to FIG. 1, which is labeled PRIOR ART, a "standard" host interface 100 to an embedded controller 102, as outlined by the ACPI standard, is shown. The interface is modeled after a standard keyboard controller-style interface and includes a COMMAND/STATUS register and a DATA IN/DATA OUT register. The interface uses an interrupt to signal the HOST processor. Separate simultaneous processes are accommodated on the HOST through the usage of two separate copies of the registers and two separate interrupts. A first interrupt, a System Control Interrupt (SCI) 104, is used by the operating system. A second interrupt, a System Management Interrupt (SMI) 106, is used in System Management Mode (SMM).

The embedded controller and the HOST processor communicate data using control bits in the COMMAND/STATUS register including an input buffer full (IBF) bit and an output buffer full (OBF) bit. The Input Buffer Full (IBF) flag is asserted when the HOST processor has written a byte of data to the command port or data port, but the embedded controller has not yet read byte so that the input buffer is full and data is ready for the embedded controller. The embedded controller reads the status byte, detects the set IBF flag, and reads the data port to get the byte of data written by the HOST processor. After the embedded controller reads the data byte, hardware automatically clears the IBF flag, signaling to the HOST processor that the data was read by the embedded controller and the input buffer of the embedded controller is empty, so that the HOST processor is free to write more data to the embedded controller.

The Output Buffer Full (OBF) flag is asserted when the embedded controller writes a byte of data into the command or data port of the embedded controller so that the output buffer is full and data is ready for the HOST processor. The HOST processor reads the status byte, detects that the OBF flag is set, and reads the data port to get the byte of data that is written by the embedded controller. After the HOST processor reads the data byte, embedded controller hardware automatically clears the OBF flag, signaling the embedded controller that the data has been read by the host computer, the output buffer is empty, and the embedded controller is free to write more data to the host computer.

Thus for each data byte transferred, either from the HOST processor to the embedded controller or from the embedded controller to the HOST processor, the COMMAND/STATUS register is read and a either the IBF or the OBF bit is checked to determine whether bit has gone to zero. The status of the transfer buffer must be checked before the next byte can be written.

The ACPI standard interface supports a burst data transfer mode that allows the operating system or system management interrupt handler to quickly read and write several bytes of data at a time without the overhead of handling system command interrupts between the commands. Assertion of the burst enable mode bit sets up the controller to guarantee a response time within a defined range, such as up to 5 microseconds.

The burst mode is useful when the controller simultaneously executes multiple tasks including a task performing communication between the controller and a separate processor. However, in the burst mode, the IBF bit or the OBF bit, depending on the direction of the transfer, must still be checked for the transfer of each byte. In the burst enable mode, the microcontroller temporarily discontinues all other processing to handle transmitted data, transfers the data, typically performs an action on the data, then returns to the discontinued processing. Each byte must be read from a transmission buffer and the data transmission flag, either the IBF or the OBF, must be monitored for the handling of each byte. Data bytes are transferred at regular intervals of approximately 1 millisecond.

Other custom interfaces to embedded controllers exist that do not conform to the ACPI standard.

What is needed is an ACPI-compliant interface that reduces data transfer overhead and increases data transfer rate. What is further needed is a faster interface between a host processor and an embedded processor.

SUMMARY OF THE INVENTION

It has been discovered that a conventional keyboard-style ACPI interface is greatly enhanced by the inclusion of a bi-directional hardware buffer and a special software protocol that allows multiple byte command and data messages to be sent in a burst fashion. The illustrative enhanced ACPI interface alleviates congestion in data transmission that results from the overhead incurred by transferring messages using multiple interrupts per message.

In accordance with one aspect of the present invention, an extended embedded controller includes a buffer for temporary storage of a plurality of data bytes and a program code for controlling data transfers to and from the buffer using a data handling technique that is ACPI-compliant.

In accordance with an embodiment of the present invention, a computer system includes a processor, a host bus connected to the processor, and an embedded controller connected to the processor via the host bus, the embedded controller including a buffer and control logic controlling transfer data bytes via the buffer byte-by-byte and monitoring a buffer full bit at the transfer of each byte. The computer system further includes a local bus connected to the embedded controller, a device connected to the embedded controller via the local bus, an extended interface connected to the processor via the host bus and connected to the device and the embedded controller via the local bus, the extended interface including a multiple-byte buffer, and an extended control logic connected to the embedded controller, the extended control logic controlling the embedded controller and the extended interface to transfer a plurality of data bytes for a single monitoring of the buffer full bit.

Many advantages are achieved by the described ACPI-compliant interface and software protocol. The described interface, software protocol, and associated communication technique advantageously communicate data from a host processor to an embedded controller and from an embedded controller to a host processor in a multiple-byte transfer without monitoring the transfer of each byte while maintaining ACPI compliance.

BRIEF DESCRIPTION OF THE DRAWINGS

The features of the described embodiments believed to be novel are specifically set forth in the appended claims. However, embodiments of the invention relating to both structure and method of operation, may best be understood by referring to the following description and accompanying drawings.

FIG. 1, labeled PRIOR ART, is a schematic block diagram illustrating a conventional embedded controller interface according to the ACPI specification.

FIG. 2 is a schematic block diagram showing an enhanced embedded controller interface in accordance with an embodiment of the present invention that is compliant with the ACPI specification.

FIG. 3 is a schematic block diagram illustrating an embodiment of an internal architecture of the enhanced embedded controller interface shown in FIG. 2.

FIG. 6 is a flow diagram showing operations performed in a host processor and an embedded controller in accordance with an embodiment of a method for controlling the enhanced embedded controller interface.

DETAILED DESCRIPTION OF THE PREFERRED EMBODIMENTS

Figure 4:
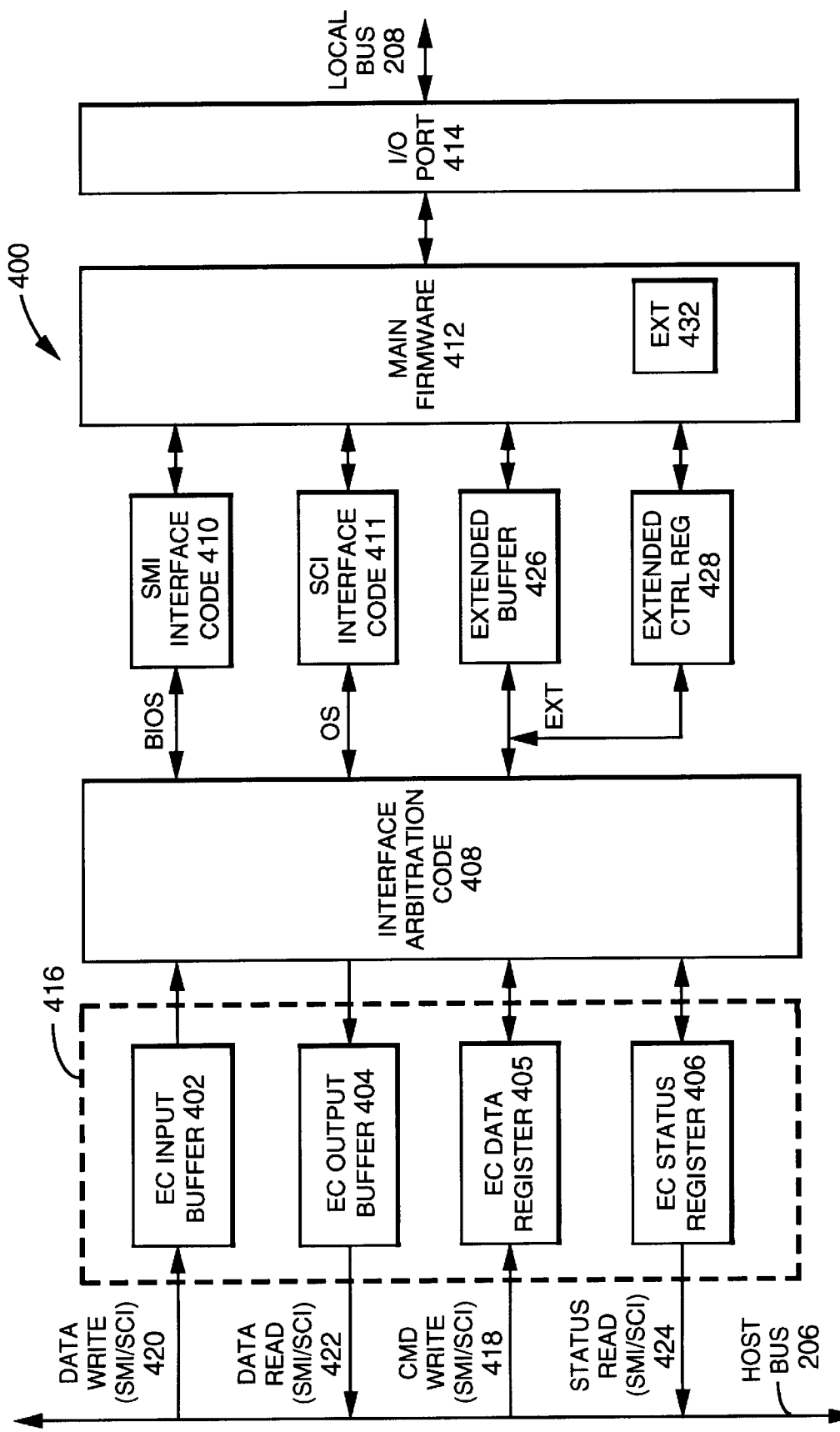
FIG. 4 is a schematic block diagram showing an embedded controller of the enhanced embedded controller interface shown in FIG. 2 that is a shared-type interface.

Referring to FIG. 2, a schematic block diagram shows an enhanced embedded controller interface 200 that is compliant with the ACPI specification. A conventional keyboard-style ACPI interface such as the interface shown in FIG. 1 is greatly enhanced by the inclusion of an enhancement interface 202 including a bi-directional hardware buffer. The enhanced embedded controller interface 200 utilizes a special software protocol that allows multiple byte command and data messages to be sent in a burst fashion. The illustrative enhanced ACPI interface alleviates congestion in data transmission that results from the overhead incurred by transferring messages using multiple interrupts per message. The enhanced embedded controller interface 200 includes a conventional embedded controller 204 that is connected to a host computer (not shown) via a host bus 206. The embedded controller 204 is also connected to one or more devices (not shown), such as controlled devices, monitoring devices, control devices, and the like, via a local bus 208.

The enhancement interface 202 is connected to the host bus 206 and connected to the local bus 208 to allow some data transfer between the host computer and the controlled devices to bypass the embedded controller 204.

Referring to FIG. 3, a schematic block diagram illustrates an embodiment of an internal architecture of the enhancement interface 202 of the enhanced embedded controller interface shown in FIG. 2. The enhancement interface 202 has buffers supplied in each direction between the host computer and the controlled devices. Accordingly, the enhancement interface 202 includes an n-byte buffer 302 for holding data received from a host computer via the host bus 206 in transit to a controlled device via the local bus 208. The enhancement interface 202 also includes an m-byte buffer 304 for holding data received from a controlled device via the local bus 208 in transit to the host computer via the host bus 206. In a typical embodiment, the n-byte buffer 302 and the m-byte buffer 304 have the same capacity. In an illustrative embodiment both the n-byte buffer 302 and the m-byte buffer 304 are 32-byte buffers, although other embodiments may have a 64-byte capacity. Still other embodiments may utilize a buffer size of any suitable size.

The enhancement interface 202 also includes a control register 306 for transferring control signals from the host computer via the host bus 206 to a controlled device via the local bus 208. The enhancement interface 202 includes a status register 308 connected between the local bus 208 and the host bus 206 for transferring status codes from the controlled devices to the host computer.

The bi-directional buffers 302 and 304 enable a transmitting agent, either the host computer or a controlled device of the plurality of controlled devices, to write a burst of data prior to setting an interrupt to the receiving agent.

Referring to FIG. 4, a schematic block diagram shows an embedded controller 204 of the enhanced embedded controller interface shown in FIG. 2 that is a shared-type embedded controller interface 400. The shared-type embedded controller interface 400 includes an embedded control input buffer 402, an embedded controller output buffer 404, an embedded controller data register (EC_DATA) 405, and an embedded controller status/control register (EC_SC) 406. The shared-type embedded controller interface 400 also includes an interface arbitration code 408, a system management interrupt (SMI) interface code 410, a system control interrupt (SCI) interface code 411, an extended buffer 426, an extended control register 428, an embedded controller main firmware module 412, and an input/output port 414.

Embedded controllers, such as the shared-type embedded controller interface 400, are devices in a general class of microcontrollers that are used to support OEM-specific implementations. Embedded controllers of various designs are suitable for usage in an ACPI system so long as the host interface of the controller complies with ACPI specifications. Embedded controllers such as the shared-type embedded controller interface 400 are designed to perform complex low-level functions through a simple interface to a host microprocessor.

Typically, embedded controllers include a host interface 416 that includes the embedded control input buffer 402, the embedded controller output buffer 404, and the embedded controller status/control register 406 that connect the embedded controller interface 400 to the host bus 206 to allow bidirectional communications. The embedded control input buffer 402 is connected to the host bus 206 by command write (SMI/SCI) lines 418 and data write lines (SMI/SCI) 420. The embedded controller output buffer 404 is connected to the host bus 206 via data read lines (SMI/SCI) 422. The embedded controller status/control register 406 is connected to the host bus 206 via status read lines (SMI/SCI) 424. The bi-directional interrupt technique reduces the host processor latency in communicating with the embedded controller 400.

The embedded controller includes registers at two address locations, the embedded controller status/control register (EC_SC) 406 and the embedded controller data register (EC_DATA) 405. The embedded controller status/control register (EC_SC) 406 serves as two registers including a control register and a status register at a single address location. The direction of a transfer determines which register is accessed.

The embedded controller data register (EC$_{13}$ DATA) 405 is useful for transferring data between a host central processing unit (CPU) and the embedded controller. The embedded controller data register (EC_DATA) 405 is a read/write register that allows additional command bytes to be issued to the embedded controller and allows an operating system to read data returned by the embedded controller. Write operations to the embedded controller data register (EC_DATA) 405 by the host computer are latched in the input data register. The write operations cause the input buffer full (IBF) flag to be set to one in the status register. Read operations from the embedded controller data register (EC_DATA) 405 return data from the output data register and clear the output buffer full (OBF) flag in the status register.

The embedded controller status/control register (EC_SC) 406 operates as two registers, a status register that is accessed during reads of EC_SC and a command register that sets a command value during write operations to the EC_SC. The embedded controller status/control register (EC_SC) 406, as the command register, is a write-only register that allows commands to be issued to the embedded controller. Write operations directed to the embedded controller status/control register (EC_SC) 406 are latched in the input data register, while the input buffer full flag (IBF) and command bit (CMD) are set in the status register, allowing the embedded controller to differentiate the start of a command sequence from a data byte write operation.

In an illustrative embodiment, three modes of communication are implemented including a system control interrupt (SCI) operating mode, a system management interrupt (SMI) operating mode, and an extended (EXT) operating mode. The SCI operating mode is controlled by the operating system and uses a global lock semaphore overhead to arbitrate shared ownership of the interface. The SMI operating mode is controlled by the BIOS. The EXT operating mode operates in combination with the SCI operating mode signals to perform extended ACPI operations including multiple-byte data transfers.

In the illustrative embodiment, the host computer controls data transfer in the SMI operating mode by writing commands to the embedded controller status/control register (EC_SC) 406 at a first defined I/O address, for example 0x1e2, and reading or writing data from or to the embedded controller data register (EC_DATA) 405 at a second defined I/O address, such as 0x1e3.

Also in the illustrative embodiment, the host computer controls data transfer in the SCI operating mode using a ACPI-standard technique in which the host computer writes a command, for example a read command RD_EC (0x80) to the embedded controller status/control register (EC_SC) 406 at a third defined I/O address, for example 0x1e0, and writes a read address in the embedded controller data register (EC_DATA) 405 at a fourth defined I/O address, for example 0x1e1. When the command completes, the output buffer full (OBF) is asserted and the host computer reads a data byte obtained from the read address at the embedded controller data register (EC_DATA) 405 0x1e1.

The illustrative embodiment also includes the extended mode in which the host computer controls data transfer using combined ACPI and extended techniques. The host computer accesses a data block including a plurality of data bytes at the extended buffer 426 at a defined address, for example 0x1e4. For a write operation, the host computer loads data into the extended buffer 426 prior to sending a write command. For a read operation, the host computer accesses the data from the extended buffer 426 after the extended embedded controller interface 400 has loaded the data. The host computer enters the extended operating mode by writing a defined code, for example 0x90, to the embedded controller status/control register (EC_SC) 406 at a defined address, for example 0x1e0. The host computer accesses a status indication of a data transfer operation from the embedded controller data register (EC_DATA) 405 at a defined address, for example 0x1e1. Once the host computer has written the extended operating mode code to the embedded controller status/control register (EC_SC) 406, the host computer controls multiple-byte data transfer operations in the SCI operating mode using the ACPI-standard technique. The host computer writes commands to the embedded controller status/control register (EC_SC) 406 and data transfer addresses to the embedded controller data register (EC_DATA) 405.

The embedded controller status/control register (EC_SC) 406 is a read-only register that indicates the current status of the embedded controller interface and has a form as follows:

| Bit7 | Bit6 | Bit5 | Bit4 | Bit3 | Bit2 | Bit1 | Bit0 |
|------|---------|---------|-------|-----|-----|-----|-----|
| IGN | SMI_EVT | SCI_EVT | BURST | CMD | IGN | IBF | OBF |

Bit IGN is ignored.

Bit SMI_EVT, when asserted indicates that a system management interrupt (SMI) event is pending and requesting an SMI query, and when deasserted indicates no SMI events are pending. The system management interrupt (SMI) event (SMI_EVT) flag is set when the embedded controller detects an internal event that demands attention of a system management interrupt handler. The embedded controller sets the SMI_EVT bit in the embedded controller status/control register (EC_SC) 406 before generating an SMI.

The bit SCI_EVT, when asserted indicates that a system control interrupt (SCI) event is pending and requesting an SCI query, and when deasserted indicates no SCI events are pending. The SCI_EVT flag is set when the embedded controller detects an internal event that demands operating system action. The embedded controller sets the SCI_EVT bit in the status register and generates a system control interrupt (SCI) to the operating system. The operating system uses the SCI_EVT flag to differentiate between command-complete SCIs and notification SCIs. The operating system uses a query command to request the cause of the SCI_EVT and initiate a response to the SCI.

The bit BURST, when asserted indicates that the embedded controller is in burst mode for polled command processing, and when deasserted indicates that the embedded controller is operating in normal mode for interrupt-driven command processing. The Burst (BURST) flag indicates that the embedded controller has received a burst enable command from the host computer and, in response, has halted normal processing and is awaiting a series of commands sent by the host computer. The BURST flag allows the operating system or system management interrupt handler to quickly read and write several bytes of data at a time without the overhead of system control interrupts between the commands.

The bit CMD, when asserted, indicates that the byte in the embedded controller data register (EC_DATA) 405 is a command byte and only used by the controller. The deasserted CMD bit indicates that the byte in the embedded controller data register (EC_DATA) 405 is a data byte and only used by the controller.

The bit IBF, when asserted indicates that the input buffer is full and data is ready for the embedded controller, and when deasserted indicates that the input buffer is empty. The Input Buffer Full (IBF) flag is set when the host computer has written a byte of data to the command port or data port, but the embedded controller has not yet read the byte. After the embedded controller reads the status byte and detects the set IBF flag, the embedded controller reads the data port to get the byte of data that is written by the host computer. After the embedded controller reads the data byte, hardware automatically clears the IBF flag, signaling to the host computer that the data has been read by the embedded controller and that the host computer is free to write more data to the embedded controller.

The bit OBF, when asserted indicates that the output buffer is full and data is ready for the host computer, and when deasserted indicates that the output buffer is empty. The Output Buffer Full (OBF) flag is set when the embedded controller has written a byte of data into the data port but the host computer has not yet read the data byte. After the host computer reads the status byte and detects that the OBF flag is set, the host computer reads the data port to get the byte of data that is written by the embedded controller. After the host computer reads the data byte, hardware automatically clears the OBF flag, signaling the embedded controller that the data has been read by the host computer and the embedded controller is free to write more data to the host computer.

In addition to the SMI interface code 410 and the SCI interface code 411, the extended embedded controller interface 400 includes an extended buffer 426, and an extended control register 428. While the standard SMI interface code 410 is controlled by a system BIOS and the standard SCI interface code 411 is controlled by the operating system, the extended buffer 426 and the extended control register 428 are controlled by an extended driver 432 that is additional to but compliant with the ACPI specification. The extended driver 432 is activated by a special extended command that extends the functionality of the extended embedded controller interface 400 beyond the ACPI specification to accelerate communications between the HOST processor and ACPI peripheral processes. In one embodiment, the extended driver 432 is responsive to a hexadecimal 0x90 code to activate the extended buffer 426 for transferring multiple-byte messages and configure the extended embedded controller interface 400 in the extended operating mode. The HOST processor loads the special command code to the embedded controller status/control register (EC_SC) 406. The HOST processor then sends subsequent commands while the extended embedded controller interface 400 is in the extended mode so that the special command code functions in combination with standard ACPI commands including a read command, a write command, a query command, a burst enable command, and a burst disable command. The direction of the data transfer is determined by ACPI-standard control bits actuated by the ACPI-standard commands. When the multiple-byte transfer activation code (0x90) is written to the embedded controller status/control register (EC_SC) 406, multiple-byte data transfers are enabled so that multiple bytes are transferred without checking the OBF and IBF bits for each data byte transferred. When the multiple-byte transfer is complete, a response status code is written to the extended control register 428 to verify that the transmission is complete.

Advantageously, the extended embedded controller interface 400 transfers the entire buffer of data bytes without monitoring the OBF and IBF bits. Further advantageously, the multiple-byte transfer is achieved while fully complying with the ACPI specification.

Also advantageously, the extended functionality of the extended embedded controller interface 400 is supplied in a vendor's BIOS and is transparent to the operating system. Accordingly, the BIOS supplies low-level control functionality for executing ACPI commands. For example, a SCI bus command may be implemented in the BIOS that defines low level bytes to be sent via the extended buffer 426 with the particular bytes that are sent defined according to information in the ACPI tables, information from boot-strap loading the operating system and the like. The BIOS interrogates the ACPI tables and other data storages to determine suitable low-level control bytes, and determine suitable control methods, typically stored in firmware, for implementing various transfer techniques.

The interface arbitration code 408 includes control logic to implement the ACPI architecture-defined mechanisms for hardware to generate defined ACPI system events. The events are supplied to notify an operating system that some action is needed. Control logic within the interface arbitration code 408 generates a system control interrupt (SCI) event signal that is used by the operating system to cause a state transition. For example, based on commands, data, and status information, the interface arbitration code 408 generates an embedded controller SCI status (EC_SC_STS) signal that is selectively enabled according to the setting of an enable bit (EC_SCI_EN) to generate an embedded controller SCI interrupt (EC_SCI).

The embedded controller main firmware module 412 performs several functions to be ACPI-compliant including SMI processing functions, SCI/SMI task queuing functions, and notification management functions.

The ACPI-compliant shared-type embedded controller interface 400 processes SMI events through the usage of a separate command set for communicating with each environment supported. For example, the shared-type embedded controller interface 400 determines which environment generates a command request, and which environment is notified upon an event detection to generate appropriate interrupts and notification values. By implication, a system management handler uses commands that parallel the functionality of all the commands defined under the ACPI including query, read, write, and other implemented commands.

The ACPIs-compliant shared-type embedded controller interface 400 queues SCI and SMI tasks in system designs utilizing sharing of the embedded controller interface between a system management interrupt handler and an operating system upon notification of any command. The embedded controller sets an appropriate event flag in the embedded controller status/control register (EC_SC) 406 only if the controller has detected an event that should be communicated to the operating system or system management handler. The embedded controller accepts commands from either environment without loss of the notification event. Later the operating system or system management handler issues a query command to the embedded controller to request the cause of the notification event.

The ACPI-compliant shared-type embedded controller interface 400 performs notification management operations by using a query command (QR_EC) to notify the operating system of system events to be addressed. If the embedded controller is shared with the operating system, the SMI handler uses the SMI_EVT flag and an SMI query command to receive event notifications. The embedded controller does not place event notifications into the output buffer of a shared interface unless the embedded controller receives a query command from the operating system or the system management interrupt handler.

The embedded controller main firmware module 412 implements several commands in an embedded controller command set to allow an operating system to communicate with embedded controllers. Embedded controller commands include a read embedded controller command (RD_EC), a write embedded controller command (WT_EC), a burst enable embedded controller command (BE_EC), a burst disable embedded controller command (BD_EC), and a query embedded controller command (QR_EC).

The read embedded controller command (RD_EC) byte is reserved for exclusive use by an operating system and allows the operating system to read a byte in the address space of the embedded controller. RD_EC directs the embedded controller to generate an SCI in response to input and output buffer transactions including transactions that deassert the IBF bit and assert the OBF bit. A RD_EC command includes a command byte written to the embedded controller status/control register (EC_SC) 406, followed by an address byte written the embedded controller data register (EC_DATA) 405. The embedded controller responds to the RD_EC by returning the byte at the addressed location. The data is read at the embedded controller data register (EC_DATA) 405 after the OBF flag is set.

The write embedded controller command (WT_EC) byte is reserved for exclusive use by an operating system and allows the operating system to write a byte into the address space of the embedded controller. WT_EC directs the embedded controller to generate an SCI in response to input and output buffer transactions including transactions that deassert the IBF bit. A WT_EC command includes a command byte written to the embedded controller status/control register (EC_SC) 406, followed by an address byte written the embedded controller data register (EC_DATA) 405, further followed by a data byte written to the embedded controller data register (EC_DATA) 405. The data byte written to the embedded controller data register (EC_DATA ) 405 is written at the addressed location.

The burst enable embedded controller command (BE_EC) allows the operating system to request dedicated attention from the embedded controller and, except for critical events, prevents the embedded controller from performing noncritical tasks other than receiving command and data from the host processor, either through operations of the system management interrupt handler or the operating system. BE_EC allows the host processor to issue several commands back to back, reducing latency at the embedded controller interface.

When operating in the burst mode, the embedded controller transitions to the burst disable state if the host processor does not issue a command within 400 $\mu$s for a first access, within 50 $\mu$s for a subsequent access, and for a total burst time of 1 ms. Furthermore, the embedded controller can disengage the burst mode at any time to process a critical event. If the embedded controller disables burst mode for any reason other than the burst disable command, the embedded controller generates a system control interrupt (SCI) to the operating system to indicate the change.

While operating in the burst mode, the embedded controller generates system control interrupts (SCIs) as in standard, non-burst mode operations, including input buffer full (IBF) and output buffer full (OBF) interrupts. The embedded controller responds to accesses within 50 $\mu$s.

The embedded controller enters burst mode through performance of combined actions by the operating system and the embedded controller. First, an operating system driver writes a Burst Enable-Embedded Controller (BE_EC) command byte. In the illustrative example the command code for the BE_EC command is (0x82). Upon receipt of the BE_EC command, the embedded controller prepares to enter the Burst Mode, for example by processing any routine activities that extend operating system interface operations for 1ms or less. In response, the Embedded Controller sets the Burst bit of the Embedded controller status/control register, puts a Burst Acknowledge byte (0x90) into the system command interrupt (SCI) output buffer, sets the output buffer full (OBF) bit, and generates an SCI to signal to the operating system that the embedded controller is operating in Burst mode.

Burst mode is terminated when the operating system driver writes the Burst Disable Embedded Controller (BD_

EC) command byte, in the illustrative embodiment a (0x83) code value, and then the Embedded Controller exits Burst mode by clearing the Burst bit in the Embedded Controller Status register and generating an SCI signal in response to deassertion of the input buffer full to 0.

The burst disable embedded controller command (BD_EC) releases the embedded controller from a previous burst enable command and allows the embedded controller to resume normal processing. The BD_EC command is sent by the operating system or the system management interrupt handler after completion of an entire queued command sequence to the embedded controller.

The query embedded controller command (QR_EC) is sent by an operating system driver to the embedded controller when the SCI_EVT flag in the embedded controller status/control register (EC_SC) 406 is set. When the embedded controller detects a system event that is to be communicated to the operating system, the embedded controller first sets the SCI_EVT flag in the embedded controller status/control register (EC_SC) 406, generates an SCI, and then waits for the operating system to send the query (QR_EC) command. The operating system detects the embedded controller SCI, determines the SCI_EVT flag is set, and sends the query command to the embedded controller. Upon receipt of the QR_EC command byte, the embedded controller places a notification byte with a value between 0–255 that indicates the cause of the notification. The notification byte indicates which interrupt handler operation is executed by the operating system to process the embedded controller SCI. A query value of zero is reserved for a spurious query result and indicates the occurrence of "no outstanding event."

The embedded controller main firmware module 412 generates interrupts using a general-purpose output port of the shared-type embedded controller interface 400. The embedded controller interrupt model uses pulse interrupts to expedite transfer of data. The embedded controller main firmware module 412 generates system control interrupts (SCIs) for events including an input buffer full (IBF) deasserted condition, an output buffer full (OBF) asserted condition, and a system control interrupt event (SCI_EVT) asserted condition.

The input buffer full (IBF) deasserted condition signals that the embedded controller has read the last command or data from the embedded control input buffer 402 and the host computer is free to send more data. The output buffer full (OBF) asserted condition signals that the embedded controller has written a byte of data into the embedded controller output buffer 404 and the host computer is free to read the returned data. The SCI_EVT asserted signal signals that the embedded controller has detected an event that is addressed by operating system attention. The operating system is to issue a query command (QR_EC) to determine the cause of the event.

The embedded controller main firmware module 412 generates the system control interrupts (SCIs) during execution of embedded controller commands according to the ACPI specification. For example, performance of a read command RD_EC includes transfer of three bytes: a command byte header, an address byte designating the read data address, and transfer of the data read to the host computer. The embedded controller main firmware module 412 generates an interrupt on deassertion of the IBF bit upon transfer of the command byte header and generates an interrupt on assertion of the OBF bit when the data is read to the host computer. No interrupt is generated for the transfer of the address byte.

Performance of a write command WT_EC includes transfer of three bytes: a command byte header, an address byte designating the write data address, and transfer of the data written. The embedded controller main firmware module 412 generates an interrupt on deassertion of the IBF bit for all three WT_EC bytes.

Performance of the query command (QR_EC) includes a transfer of two bytes: a command byte header and transfer of a query value to the host computer. No interrupt is generated on transfer of the command byte header. The embedded controller main firmware module 412 generates an interrupt on assertion of the OBF bit when the query value is transferred to the host computer.

Performance of the burst enable command (BE_EC) includes a transfer of two bytes: a command byte header and a burst acknowledge byte. No interrupt is generated on transfer of the command byte header. The embedded controller main firmware module 412 generates an interrupt on assertion of the OBF bit when the burst acknowledge byte is transferred to the host computer.

Performance of the burst disable command (BD_EC) includes transfer of a single byte, the command byte header. The embedded controller main firmware module 412 generates an interrupt on deassertion of the IBF bit.

The shared-type embedded controller interface 400 is an example of the most common host interface architecture incorporated into microcontrollers. The shared-type embedded controller interface 400 is modeled after a standard IA-PC architecture keyboard controller. The standard keyboard controller is accessed at addresses 0x60 and 0x64 in system I/O space. Port 0x60 is a data register that allows bi-directional data transfers to and from the host and embedded controller 400. Port 0x64 is a command/status register that returns port status information resulting from a read operation, and generates and sends a command sequence to the embedded controller 400 for a write operation. Controllers in the class of the shared-type embedded controller interface 400 also include a second decode range that shares the properties of a keyboard interface by including a command status register and a data register.

An operating system or system management handler initiates communication with the shared-type embedded controller interface 400 by acquiring ownership of the interface through usage of global lock, which is well-known with respect to the ACPI specification, or by default with the operating system accessing the interface as a non-shared resource. The operating system or system management handler, after acquiring ownership of the interface, passes a command byte to the interface, followed by zero or more data bytes. The command byte indicates the type of action to be taken and defines the data bytes. The data bytes are sent either from the interface or to the interface.

The embedded controller has two status bits that indicate whether the embedded controller status/control register (EC_SC) 406 and the embedded controller data register (EC_DATA) 405 have been read. The status bits indicate whether the host computer or the embedded controller has received transferred data. When the host computer writes data to the status (command) or data register of the embedded controller, the input buffer flag (IBF) in the status register is set within 1 microsecond. When the embedded controller reads the data from the input buffer, the input buffer flag is reset. When the embedded controller writes data into the output buffer, the output buffer flag (OBF) in the status register is set. When the host processor reads the data from the output buffer, the output buffer flag is reset.

Figure 5:
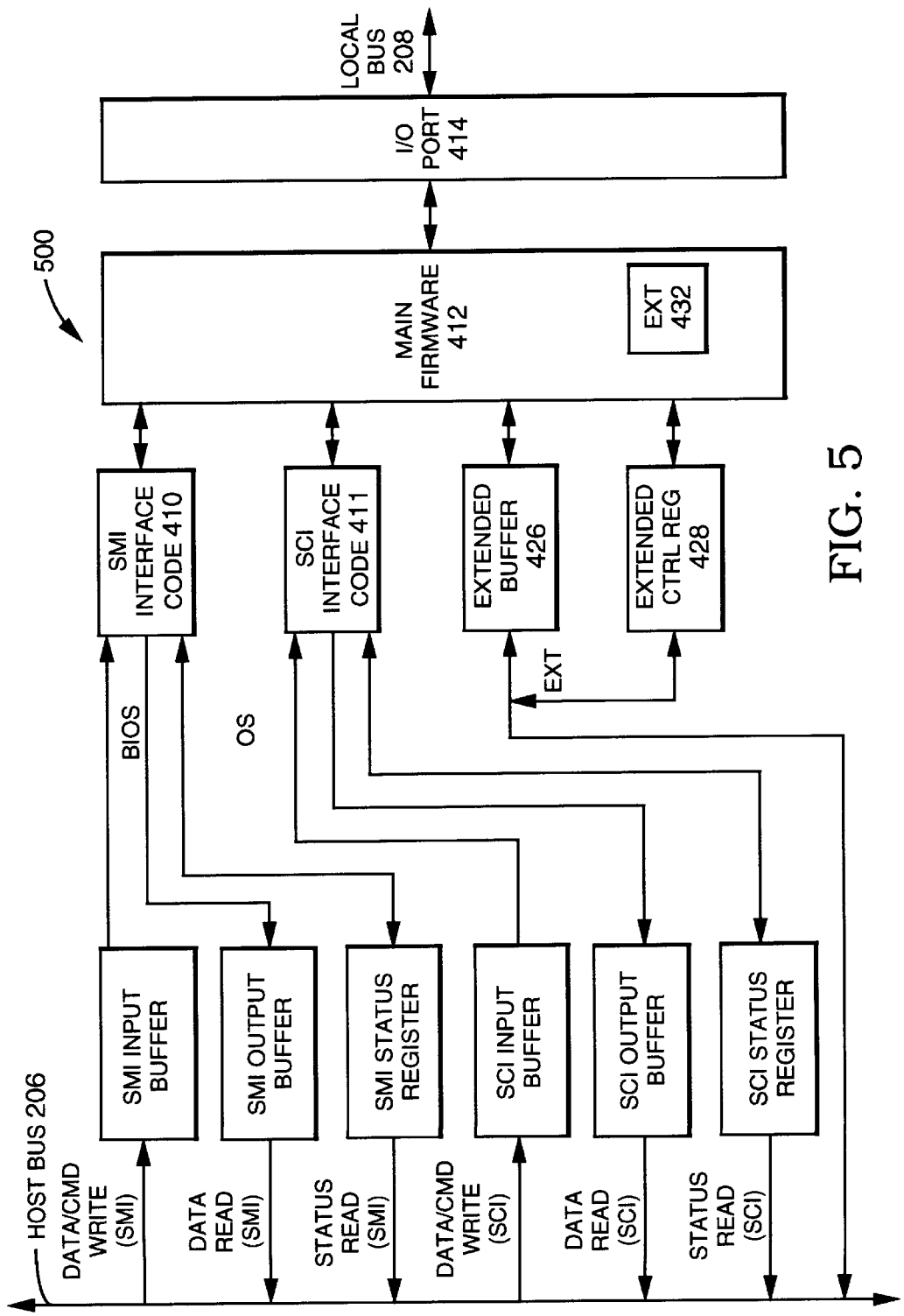
FIG. 5 is a schematic block diagram showing an embedded controller of the enhanced embedded controller interface shown in FIG. 2 that is a private-type interface.

The shared-type embedded controller interface 400 is shared between an operating system and system management code and utilizes a global lock semaphore overhead to arbitrate ownership. Referring to FIG. 5, an alternative architecture, a non-shared embedded controller 500, is shown that includes a dedicated ACPI interface. The private interface of the non-shared embedded controller 500 allows an operating system to communicate with the embedded controller 500 without software overhead associated with usage of the global lock. Several common embedded controller interface system configurations include a non-shared embedded controller, an integrated keyboard controller and embedded controller, a standard keyboard controller, and dual embedded controllers.

The non-shared embedded controller is utilized when a system management handler remains enables and therefore need not communicate with the embedded controller when the system transitions to the ACPI mode. The operating system includes all normal types of system management events so that the system management handler does not need to take any actions.

The integrated keyboard controller and embedded controller supplies three host interfaces including a standard keyboard controller in an existing component chip set and I/O controller, with an additional discrete, standard embedded controller with two interfaces for system management activities.

The standard keyboard controller and embedded controller includes three host interfaces by supplying a keyboard controller as a distinct component and two host interfaces are supplied in the embedded controller for system management activities.

The two embedded controller system supplies up to four host interfaces using two embedded controllers. One embedded controller performs system management activities for up to two host interfaces. One embedded controller supplies keyboard controller functions for up to two host interfaces.

Referring to FIG. 6, a flow diagram shows operations performed in a host processor and an embedded controller in accordance with an embodiment of a method for controlling the enhanced embedded controller interface. An enhanced embedded interface controller process 600 includes a host process 602 that executes in a host computer and an embedded controller process 604 that executes in the embedded controller 204. The enhanced embedded interface controller process 600 begins execution in the host process 602 with a communication process that is selected between an enhanced process or a standard process. If a standard communication process is selected, a begin standard step 606 begins the process by preparing a standard command and writing the standard command to a standard command register in a "write command to command register" operation 612. Alternatively, if the enhanced communication process is selected, a begin enhanced step 608 begins the process by preparing an enhanced command. The enhanced operation begins by writing a data packet to an outbound buffer in a write data packet step 610. The data packet typically includes a designation of the read buffer length and the data to be transferred. The host process 602 then writes the enhanced command to the standard command register in the "write command to command register" operation 612. The "write command to command register" operation 612 automatically sets an Input Buffer is Full (IBF) status bit in the embedded controller status/control register 406, indicating that the input buffer is full and data is ready for the embedded controller. The write command to command register operation 612 also automatically sets a command (CMD) bit in the embedded controller status/control register 406. A set CMD bit indicates that the byte in an embedded controller data register, the embedded control input buffer 402, is a command byte that is only to be used by the embedded controller. The write command to command register operation 612 then generates an interrupt signal that is sent to the embedded controller 204. Following the write command to command register operation 612, the host process 602 enters a sleep state 614.

The write command to command register operation 612 causes the embedded controller 204 to begin executing an interrupt service routine at a begin ISR step 616 that initiates execution of the embedded controller process 604. The enhanced embedded interface controller process 600 begins with a read STATUS register operation 618 to first verify that the IBF bit is set, and that the CMD bit is set. The embedded controller 204 then reads the command byte 620 to determine whether the data transfer requested by the host computer is a standard-ACPI data transfer or an enhanced-ACPI data transfer for transferring a plurality of bytes with a single interrupt. In the illustrative embodiment, the host computer writes a hexadecimal code 0x90 to the embedded controller status/control register (EC_SC) 406 to request the enhanced-ACPI data transfer mode. After ascertaining the presence of the command in the read STATUS register operation 618, the embedded controller follows with a read command (CMD) register operation 620. The read command register operation 620 automatically clears the IBF bit of the embedded controller status/control register 406 and reads the CMD register to determine whether the command is a buffer-type command.

In the present example, a command type logic block 622 directs that, if the command is not a buffer-type command, the embedded controller process 604 sets an interrupt request (IRQ) to the activate the host process 602 executing in the host computer in a set IRQ to HOST operation 624. The set IRQ to HOST operation 624 indicates acceptance of a command byte by the embedded controller process 604 and transfers notification of the acceptance to the host process 602. Note that the illustrative operating method is exemplary only and does not cover the case of all commands. For example, a BE_EC command does not generate an interrupt on receipt of a command.

The host process 602 is activated from the sleep state 614, which is responsive to an input buffer full (IBF) setting of 0 or an interrupt request (IRQ), by the interrupt request (IRQ). The host process 602, in response to the IRQ signal, jumps to a "standard" interrupt service routine 626, which includes a read/write data operation 628. The read/write data operation 628 reads or writes data from the embedded controller input buffer 402 or embedded controller output buffer 404 to a destination device, either the host computer or a controlled device. Following the read/write data operation 628, the host process 602 enters a byte-transfer sleep state 630. The byte-transfer sleep state 630 is terminated by a data byte transfer interrupt, upon which the host process 602 executes the read/write data operation 628. The read/write data operation 628 and the byte-transfer sleep state 630 alternate as data is transferred byte-by-byte. The standard embedded controller interface operates by alternating the read/write data operation 628 and the byte-transfer sleep state 630 for each transferred byte. The data transfer interrupt for each byte is based on input buffer full (IBF) and output buffer full (OBF) settings.

Alternatively, the command type logic block 622 directs that, when the command is a buffer-type command, the embedded controller interface 400 implements a "doorbell-type" communication technique. Using the doorbell technique, a host computer sends commands using a driver routine that loads data into a buffer, either the embedded control input buffer 402 or the embedded controller output buffer 404, and sends control signals to the embedded controller status/control register 406 to request service. The host computer then waits to for the requested transaction to complete with the extended embedded controller interface 400 fully handling transfer of the data. For example, the host computer sends a block of data to the embedded controller interface 400 by loading a complete transfer block, typically including data or commands, to the embedded control input buffer 402, setting the input buffer full (IBF) bit. In the multiple-byte transfer, the IBF bit indicates that the entire message is queued into the embedded control input buffer 402 and ready to be read. In contrast, a standard ACPI-type communication transfers only one byte for each set/reset handling of the IBF bit.

The embedded controller process 604 begins a multiple-byte transfer operation by executing a read buffer length operation 632. In a read buffer length operation 632, the embedded controller process 604 reads a buffer length from the control register 306 of the enhancement interface 202. The embedded controller process 604 then reads a data packet from the m-byte buffer 304 or n-byte buffer 302, depending on the direction of the data transfer in a read data packet from buffer operation 634.

The embedded controller process 604 processes the command written to the command register in a process command operation 636. The process command operation 636 performs a read or write operation depending on the type of data transfer specified by a command selected from the ACPI-standard commands. In the extended mode, the global lock is set.

The embedded controller process 604 writes a response data packet to either the embedded control input buffer 402 or the embedded controller output buffer 404, depending on the direction of the transfer, in a write response data packet to buffer operation 638. In a write response status byte operation 640, the embedded controller process 604 writes a response status byte to the embedded controller output buffer 404. By writing the response status byte, the embedded controller process 604 automatically setting the output buffer is full (OBF) bit of the embedded controller status/control register 406 indicating the output buffer is full and data is ready for the host computer. In a set IRQ operation 642, the embedded controller process 604 sets an interrupt request (IRQ) to the host computer, indicating acceptance of the command byte.

The host process 602 is activated from the sleep state 614 by the interrupt request (IRQ), causing the host process 602 to jump to an enhanced interrupt service routine 644. The enhanced interrupt service routine 644 reads a response status byte from the embedded controller output buffer 404 in a read response status byte operation 646, which automatically clears the output buffer is full bit (OBF) in the embedded controller status/control register 406. The host process 602 reads a response data packet from the embedded controller output buffer 404 in a read response data packet operation 648. The host process 602 terminates in a complete operation 650 with a single interrupt that is utilized at the completion of the command.

The advantages of the described bi-directional hardware buffer and a special software protocol that allows multiple byte command and data messages to be sent in a burst fashion are illustrated in a following example. The *ACPI implementer's Guide*, Jun. 23, 1997 describes an approach for utilizing the operating system to read a word from the embedded controller SMBus space to receive a temperature. In the example, the host sends the SMB address, command, and command protocol to an SMBus controller implemented inside of an embedded controller. The controller returns two bytes of data including the charger status.

The following are specifics of one exemplary implementation. The EC+SC port address is 66h in the system I/O space. The EC_DATA port address is 62h in the system I/O space. The SMBus address space is 40h. The SMBus Command Complete Notification Header is 21h. The host sends a read temperature device status command, which generates the following SMBus transaction: SMB_ADDR (BASE+2=0x42)=temperature device=0x12. SMB_CMD (BAS+3)=0x43)=Get Temperature=0x13. SMB_PRTCL (BASE+0=0x40)=Read Word=0x07. As a result of the transaction, the following information is generated: SMB_DATA[0] (BASE+4=0x44)=Low data byte of received temperature status=0x10 (for example). SMB_DATA[1](BASE+5=0x45)=High data byte of received temperature status=0xC0 (for example).

| Host Processor Sequence | Embedded Controller Sequence |
|---|---|
| OS checks for IBF to be cleared: I/O RD 0x66→0x00 | |
| Write BE EC command byte to controller: I/O WR 0x66→0x82 (command byte for burst enable) | IBF is set. |
| OS schedules other tasks and waits for an SCI event EC_SCI to be deasserted. | EC processes the burst enable command, sets the BURST flag, and sets WR STR→0x10 (burst enabled) which generates an SCI when OBF=1. |
| OS issues write byte command to SMB ADDR register. | Embedded controller waits for input buffer full. |
| OS checks status register to continue processing I/O RD 0x66→0x10 (burst enabled, input buffer empty) | Embedded controller waits for input buffer full. |
| OS writes WR_EC command byte to controller I/O WR 0x66→0x81 (command byte for write) | Embedded controller receives write command. RD IBR→0x81 |

-continued

| Host Processor Sequence | Embedded Controller Sequence |
|---|---|
| OS waits for 1 microsecond. | Embedded controller drives SCI to signal input buffer empty. |
| OS waits for SCI to signal input buffer empty. | Embedded controller waits for input buffer full. |
| OS checks status register to continue processing I/O RD 0x66→0x10 (burst enabled, input buffer empty). | Embedded controller waits for input buffer full. |
| OS writes next byte of command sequences (address of location to write=base+2=0x40+2=0x42): I/O WR 0x62→0x42 (address byte to write) | Embedded controller receives address byte: RD IBR→0x42 |
| OS waits for 1 microsecond. | Embedded controller drives SCI to signal input buffer empty. |
| OS waits for SCI to signal input buffer empty. | Embedded controller waits for input buffer full. |
| OS writes last byte of command sequence (address of device on SMBus=charger device=0x12). I/O WR 0x62→0x12 (data byte to write). | Embedded controller reads next byte. RD IBR→0x12 |
| OS waits for 1 microsecond and then waits for an SCI event. | Embedded controller drives SCI to signal input buffer empty. |
| OS issues write byte command to SMB_CMD register. | Embedded controller writes data to SMBus buffer: WR 0x42→0x12 (SMB_ADDR=Charger Device). |
| OS checks status register to continue processing: I/O RD 0x66→0x10 (burst enabled, input buffer empty) | Embedded Controller waits for input buffer full. |
| OS writes WR_EC command byte to controller: I/O WR 0x66→0x81 (command byte for write) | Embedded Controller receives write command. RD IBR→0x81 |
| OS waits 1 microsecond. | Embedded controller drives SCI to signal input buffer empty. |
| OS waits for SCI to signal input buffer empty. | Embedded controller waits for input buffer full. |
| OS checks status register to continue processing: I/O RD 0x66→0x10 (burst enabled, input buffer empty). | Embedded controller waits for input buffer full to receive the remaining portion of the write command. |
| OS writes next byte of command sequence (address of location to write=base+3=0x40+3=0x43): I/O WR 0x62→0x43 (address byte to write) | Embedded controller receives address byte. RD IBR→0x43 |
| OS waits for 1 microsecond and then waits for an SCI event. | Embedded controller drives SCI to signal input buffer empty. |
| OS checks status register to continue processing: I/O RD 0x66→0x10 (burst enabled, input buffer empty) | Embedded controller waits for input buffer full. |
| OS writes last byte of command sequence (command byte for SMBus transaction=ChargerStatus=0x13). I/O WR 0x62→0x13 (data byte to write). | Embedded controller reads next byte: RD IBR→0x13 |
| OS waits for 1 microsecond and then waits for an SCI event. | Embedded controller drives SCI to signal Input buffer empty. |
| OS issues write byte command to SMB_PRTCL register to initiate SMBus transaction. | Embedded controller writes data to SMBus buffer: WR0x43→0x13 (SMB CMD=ChargerStatus). |
| OS checks status register to continue processing: I/O RD 0x66→0x10 (burst enabled, input buffer empty) | Embedded controller waits for input buffer full. |
| OS writes WR_EC command byte to controller: I/O WR 0x66→0x81 (command byte for write) | Embedded controller receives write command: RD IBR→0x81 |
| OS waits 1 microsecond and then waits for an SCI event. | Embedded controller drives SCI to signal input buffer empty. |
| OS checks status register to continue processing: I/O RD 0x66→0x10 (burst enabled, input buffer empty) | Embedded controller waits for input buffer full to receive the remaining portion of the write command. |

-continued

| Host Processor Sequence | Embedded Controller Sequence |
|---|---|
| OS sends next byte of command sequence (address of location to write=base+0=0x40+0=0x40): I/O WR 0x62→0.40 (address byte to write) | Embedded controller receives address byte: RD IBR→0x40 |
| OS waits for SCI to signal input buffer empty. | Embedded controller drives SCI to signal input buffer empty. |
| OS checks status register to continue processing: I/O RD 0x66→0x10 (burst enabled), input buffer empty. | Embedded controller waits for input buffer full. |
| OS writes last byte of command sequence (protocol byte for SMBus transaction=Read Word=0x07): I/O WR 0x62→0x07 (data byte to write) | Embedded controller reads next byte: RD IBR→0x07 |
| OS waits for SCI to signal input buffer empty. | Embedded controller writes data to SMBus buffer: WR 0x40→0x07 (SMB_PRTCL=Read Word) |
| OS waits for SCI to signal input buffer empty. | Embedded controller drives SCI to signal input buffer empty. |
| OS issues burst disable command to embedded controller to allow SMBus transaction to start. | Embedded controller waits for input buffer full. |
| OS checks status register to continue processing: I/O RD 0x66→0x10 (burst enabled, input buffer empty) | Embedded controller waits for input buffer full. |
| OS writes BD_EC command byte to controller: I/O WR 0x66→0x83 (command byte for burst disable) | Embedded controller burst disable command: RD IBR→0x83 |
| OS clears and re-enables SCI for embedded controller interrupt. | Embedded controller clears burst state in status register: WR STR→0x00 (burst disabled). |
| OS waits for SCI. | Embedded controller sees SMB_PRTCL register is non-zero and initiates SMBus transaction. |
| OS waits for SCI. | Embedded controller completes SMBus transaction and sets event flag in status register and generates SCI. WR STR→0x20 (SCI event detected). |
| OS receives embedded controller SCI. | Embedded controller waits for input buffer full. |
| OS checks status register to continue processing: I/O RD 0x66→0x20 (event detected, burst disabled, input buffer empty, output buffer empty) | Embedded controller waits for input buffer full. |
| OS issues query command to embedded controller. | Embedded controller waits for input buffer full. |
| OS writes QR_EC command byte to controller: I/O WR 0x66→0x84 (command byte for query) | Embedded controller receives input buffer full interrupt and reads command: RD IBR→0x84 |
| OS clears and re-enables SCI for embedded controller interrupt and waits for SCI to signal output buffer full. | Embedded controller writes query notification to output buffer (notification for SMBus complete): WR OBR→0x21 |
| OS waits for SCI to signal output buffer full. | Embedded controller clears event status bit (no more events pending): WR STR→0x01 (no event, output buffer full) |
| OS waits for SCI to signal output buffer full. | Embedded controller generates SCI. |
| OS receives SCI and checks status register: I/O RD 0x66→0x01 (output buffer full) | Embedded controller waits for input buffer full. |
| OS reads returned data from data register: I/O RD 0x62→0x21 | Embedded controller waits for input buffer full. |
| OS executes handler for returned notification (Status command complete). | Embedded controller waits for input buffer full. |
| OS issues burst enable command to prepare for reading of multiple bytes of returned data. | Embedded controller waits for input buffer full. |
| OS checks for busy bit and for IBF to be | Embedded controller waits for input |

-continued

| Host Processor Sequence | Embedded Controller Sequence |
|---|---|
| cleared I/O RD 0x66→0x00 | buffer full. |
| Write BE_EC command byte to controller: | Embedded controller receives input buffer full interrupt and reads command: |
| I/O WR 0x66→0x82 (command byte for burst enable). | RD IBR→0x82 (burst enable command received). |
| OS schedules other tasks and waits for an SCI event (EC_SCI to be deasserted). | Embedded controller processes burst enable command, sets burst bit in status register, and generates SCI when ready: WR STR→0x10 (burst enabled) |
| OS receives embedded controller SCI. | Embedded controller waits for input buffer full. |
| OS issues read byte command for SMB DATA[0] register. | Embedded controller waits for input buffer full. |
| OS checks status register to continue processing: | Embedded controller waits for input buffer full. |
| I/O RD 0x66→0x10 (burst enabled, input buffer empty). | |
| OS Writes RD_EC command byte to controller: | Embedded controller receives RD_EC command. |
| I/O WR 0x66→0x80 (command byte for read). | RD IBR→0x80 |
| OS waits for 1 microsecond and then waits for SCI to signal output buffer full. | Embedded controller drives SCI to signal input buffer empty. |
| OS checks status register to continue processing: | Embedded controller waits for input buffer full to receive the remaining portion |
| I/O RD 0x66→0x10) burst enabled, input buffer empty). | of the RD_EC command. |
| OS writes next byte of command sequence (address of | Embedded controller receives address byte. |
| SMB_DATA[0]=base+4=0x40+4=0x44): | RD IBR→0x44 |
| I/O WR 0x62→0x44 (address byte to read). | |
| OS checks status register to continue processing: | Embedded controller reads requested data from buffer: |
| I/O RD 0x66→0x10 (burst enabled, input buffer empty) | RD 0x44→0x10 (value at SMB DATA[0]) |
| OS checks status register to continue processing: | Embedded controller writes data to output buffer: |
| I/O RD 0x66→0x10 (burst enabled, input buffer empty). | WR OBR→0x10 (sets OBF flag) |
| OS checks status register to continue processing: | Embedded controller waits for input buffer full. |
| I/O RD 0x66→0x11 (burst enabled, input buffer full). | |
| OS reads returned data from data register: | Embedded controller waits for input buffer full. |
| I/O RD 0x62→0x10 | |
| OS issues read byte command for SMB DATA[1] register. | Embedded controller waits for input buffer full. |
| OS checks status register to continue processing: | Embedded controller waits for input buffer full. |
| I/O RD 0x66→0x10 (burst enabled, input buffer empty) | |
| OS writes RD_EC command byte to controller: | Embedded controller receives RD_EC command. |
| I/O WR 0x66→0x80 (command byte for read). | RD IBR→0x80 |
| OS checks status register to continue processing: | Embedded controller waits for IBF to receive the remaining portion of the write |
| I/O RD 0x66→0x10 (burst enabled, input buffer empty) | command. |
| OS sends next byte of command sequence (address of | Ernbedded controller receives address byte: |
| SMB_DATA[1]=base+5=0x40+5=0x45): | RD IBR→0x45 |
| I/O WR 0x62→0x45 (address byte to read). | |
| OS checks status register to continue processing: | Embedded controller reads requested data from buffer: |
| I/O RD 0x66→0x10 (burst enabled; input buffer empty) | RD 0x45→0xC0 (value at SMB_DATA[1]) |
| OS checks status register to continue processing: | Embedded controller writes data to output buffer: |
| I/O RD 0x66→0x10 (burst enabled, input buffer empty) | WR OBR→0xC0 (sets OBF flag). |
| OS checks status register to continue processing: | Embedded controller waits for input buffer full. |
| I/O RD 0x66→0x11 (burst enabled, input buffer full) | |

| Host Processor Sequence | Embedded Controller Sequence |
|---|---|
| OS reads returned data from data register: I/O RD 0x62→0xC0 | Embedded controller waits for input buffer full. |
| OS issues burst disable command to allow embedded controller to resume normal processing. | Embedded controller waits for input buffer full. |
| OS checks status register to continue processing: I/O RD 0x66→0x10 (burst enabled, input buffer empty). | Embedded controller waits for input buffer full. |
| OS writes BD_EC command byte to controller: I/O WR 0x66→0x83 (command byte for burst disable) | Embedded controller receives burst disable command: RD IBR→0x83 |
| OS clears and re-enables SCI for embedded controller interrupt. | Embedded controller clears burst flag in status register: WR STR→0x00 (burst disabled) Embedded controller resumes normal processing. |

An advantageous approach is depicted in the following software routine that utilizes a control method provided by the system BIOS to reduce the number of interrupts.

```
Method(TMP, 0) (
        Return (RTMP( ))
    } // Method(_TMP)    // Returns current temperature
```

The following listing of computer executable code illustrates an example an ASL code routine showing a typical implementation of reading a temperature from an LM75 device (thermal sensor integrated circuit):

```
// Read temperature register
Method(RTMP, 0)
        // Set pointer register (occupy the command byte) to 0x00
        // DATW, DB00 and DB01 are defined as global buffer fields
        Store (RWRD (TSAD, 0x00), DW00)
                // RWRD routine defined later
        // Somehow LM75 returns right byte first! Need to swap bytes
        Store (DB00, Local0)
        Store (DB01, Local1)
        Store (Local1, DB00)
        Store (Local0, DB01)
                // After shift, DW00 has temperature*2 in Celsius
                // Bit 8-1 = whole value, bit 0 = decimal value in 0.5c
                // For example, 000110011b (51 decimal) => 25.5c
        ShiftRight(DW00, 7, DW00)
                // Multiply temperature by 10 to
                // convert it to format xx.y (255=> 25.5c)
        // After shift, DW01 has temperature*8 in Celsius
        ShiftLeft(DW00, 2, DW01)
        Add(DW01, DW00, DW00)
                // Convert to Kelvin in format xxx.y (2732=> 273.2k)
        Add(DW00, 2732, DW00)
        Return (DW00)
} // Method(RTMP)
```

The following listing of computer executable code illustrates a routine implementing the extended embedded controller for an "SMBus Read Word".

```
// Read word protocol
Method(RWRD, 2) {
                // Arg0 = address byte
                // Arg1 = command byte
        Store (0x91, TurboData)
        // Send buffer command 0x91 = "SMBus Read Word"
        Or(Arg0, 0x01, TurboData)
                // Device address + Read command
        Store (Arg1, TurboData)   // Command byte
        Store (0x04, TurboCtrl)
                // ring outbound doorbell indicating buffer full Sleep (1) //
allow host processor to do other things
        And(TurboCtrl, 0x0B, locA10)
                // Check inbound doorbell for completion
        While(LEqual(Local0, Zero)) {
                Stall (1)
                And(TurboCtrl, 0x08, Local0))
        // DB00 and DB01 are defined as global buffer fields
        Store(TurboData, DB00)
                // Store in 1st byte of the buffer
        Store(TurboData, DB01)
                // Store in 2nd byte of the buffer
        Return(DATW)         // Return word data
// Method(RWRD)
```

The illustrative extended embedded controller includes two registers for accessing the bidirectional hardware buffer using a special software protocol. In the illustrative embodiment, the registers are termed a "TurboData" register and a "TurboCtrl" register that are defined in the same memory space as the I/O port space of the processor. The TurboData and TurboCtrl registers are defined, as follows:

```
// Turbo SMB based ports. 8 bit access.
OperationRegion (TurboData, SystemIO, 0xE5, 0x01)
Field (TurboData, ByteAcc, NoLock, Preserve) {
        TDAT, 8    // Host status
}
// Turbo SMB based ports. 8 bit access.
OperationRegion (TurboCtrl, SystemIO, 0xE4, 0x01)
Field (TurboCtrl, ByteAcc, NoLock, Preserve) {
        TCTL, 8    // Host status
}
```

Figure 7:
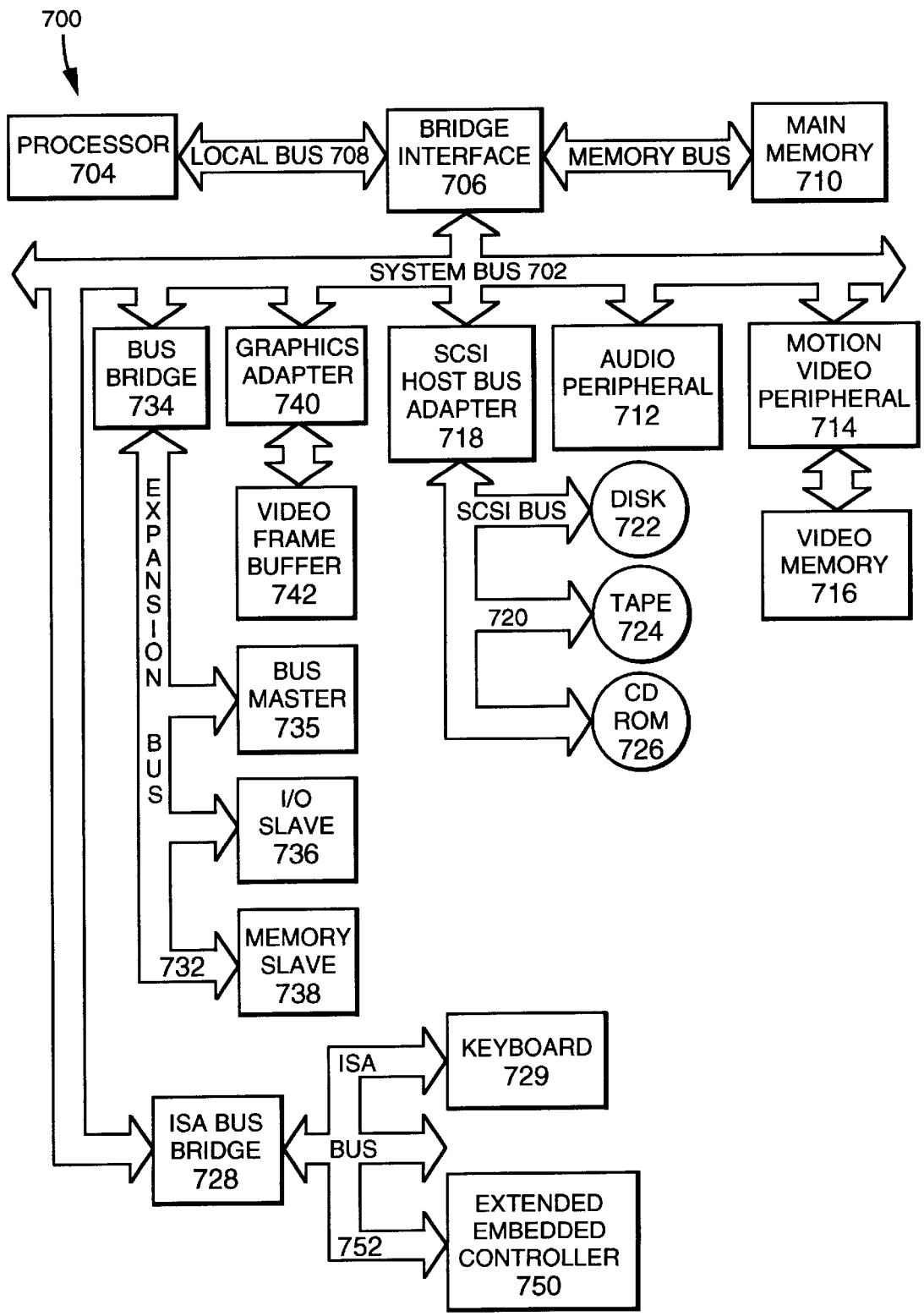
FIG. 7 is a schematic block diagram showing an embodiment of a computer system including the enhanced embedded controller interface shown in FIG. 2.

Referring to FIG. 7, a schematic block diagram shows an embodiment of a computer system including the enhanced embedded controller interface shown in FIG. 2. The device computer 700 includes a host bus 702 for communicating among several devices. A suitable host bus 702 is a Peripheral Component Interconnect (PCI) bus although other bus systems may alternatively be used. A processor 704 is connected to the host bus 702 through a bridge interface 706, which has a direct connection to the processor 704 via a local bus 708. The bridge interface 706 includes interfacing logic and a cache memory. A main memory 710 supplies storage for data structures and program code for execution by the processor 704 and communicates with the processor 704 via the bridge interface 706 with the cache memory internal to the bridge interface 706 providing caching between the processor 704 and the main memory 710.

Various combinations of devices may be connected to the host bus 702 for interaction with the processor 704. In the illustrative embodiment, devices connected to the host bus 702 include an audio peripheral 712 and a motion video peripheral 714. The motion video peripheral 714 is further connected to a video memory 716.

In the illustrative embodiment, a Small Computer Systems Interface (SCSI) host bus adapter 718 is included to connect the host bus 702 to a SCSI bus 720. The SCSI bus 720 is supplied for connection to devices such as storage devices including a disk storage 722, a tape storage 724, and a CD ROM storage 726. In other embodiments, various alternative interfaces may be substituted for the SCSI bus 720 such as an Enhanced Small Disk Interface (ESDI) or Intelligent Drive Electronics (IDE).

The device computer 700 includes an ISA bus bridge 728 that is connected to the host bus 702. The ISA bus bridge 728 supplies interfacing to various devices including a keyboard 729 and an embedded controller 750. In the illustrative embodiment, the embedded controller 750 is compliant with an ACPI power control system which is designed and manufactured by Microsoft of Redmond, Wash. In other embodiments, a device driver for the network interface manages power in a network device in a manner similar to the ACPI power control system.

The host bus 702 is connected to an expansion bus 732 by a bus bridge 734. In one example of a device computer 700, the expansion bus 732 is an Industry Standard Architecture (ISA) bus and the bus bridge 734 is a serial input/output (SIO) PCI/ISA bridge. In other embodiments, an expansion bus 732 may be omitted or replaced by other known buses including EISA, microchannel, or other bus. The expansion bus 732 is typically used to connect additional devices to the device computer 700. In the illustrative example, a bus master 735 and several slave devices such as an input/output slave 736 and a memory slave 738 are connected to the expansion bus 732.

A graphics adapter 740 is connected to the host bus 702 for supplying graphics capabilities to the device computer 700. The graphics adapter 740 is connected to a video frame buffer 742.

In the illustrative device computer 700, messages are generated and consumed by a wide variety of subsystems performed a wide array of functions including sound processing and performance, video conferencing, high end graphics, high-speed networking, and many other applications including highly complex analysis and control applications.

The various subsystems within the device computer 700 perform multiple different functions and generate messages that are communicated among subsystems in the device computer 700. This transmission of messages is used to control the system using a network management protocol. In an illustrative embodiment, a Simple Network Management Protocol (SNMP) is used to control subsystems in the device computer 700.

While the invention has been described with reference to various embodiments, it will be understood that these embodiments are illustrative and that the scope of the invention is not limited to them. Many variations, modifications, additions and improvements of the embodiments described are possible. For example, those skilled in the art will readily implement the steps necessary to provide the structures and methods disclosed herein, and will understand that the process parameters, materials, and dimensions are given by way of example only and can be varied to achieve the desired structure as well as modifications which are within the scope of the invention Variations and modifications of the embodiments disclosed herein may be made based on the description set forth herein, without departing from the scope and spirit of the invention as set forth in the following claims.

What is claimed is:

1. A computer system comprising:

a processor;

a host bus coupled to the processor;

an embedded controller coupled to the processor via the host bus, the embedded controller including a buffer and control logic that is capable of controlling transfer data bytes via the buffer byte-by-byte and monitoring a buffer full bit at the transfer of each byte;

a local bus coupled to the embedded controller;

a device coupled to the embedded controller via the local bus;

an extended interface coupled to the processor via the host bus and coupled to the device and the embedded controller via the local bus, the extended interface including a multiple-byte buffer; and an extended control logic coupled to the embedded controller, the extended control logic capable of controlling the embedded controller and the extended interface to transfer a plurality of data bytes for a single monitoring of the buffer full bit, the processor being capable of loading data into the multiple-byte buffer, sending a transaction command to the extended control logic, and waiting for the commanded transaction to complete, the extended control logic controlling execution of the transaction.

2. A computer system according to claim 1 wherein:

the control logic and the extended control logic control data byte transfer operate in compliance with an Advanced Configuration and Power Interface (ACPI) specification.

3. A computer system comprising:

a processor;

a host bus coupled to the processor;

an embedded controller coupled to the processor via the host bus, the embedded controller including a buffer and control logic controlling transfer data bytes via the buffer byte-by-byte and monitoring a buffer full bit at the transfer of each byte;

a local bus coupled to the embedded controller;

a device coupled to the embedded controller via the local bus;

an extended interface coupled to the processor via the host bus and coupled to the device and the embedded controller via the local bus, the extended interface including a multiple-byte buffer;

an extended control logic coupled to the embedded controller, the extended control logic controlling the embedded controller and the extended interface to transfer a plurality of data bytes for a single monitoring of the buffer full bit;

a host process executable in the processor and including a combined standard-ACPI and enhanced-ACPI data transfer control process, the host process further including:

a process for writing a data packet including a plurality of data bytes to the multiple-byte buffer for an enhanced-ACPI data transfer;

an ACPI-compliant process for writing a command code to a standard command register;

a sleep process for temporarily terminating execution awaiting a wakeup signal;

a read/write data byte process responsive in the standard-ACPI data transfer control process to an interrupt request for reading/writing data from/to a data register in response to a wakeup signal;

a read response status process responsive in the enhanced-ACPI data transfer mode to an interrupt request for reading a response status from a data register;

a read response data process responsive in the enhanced-ACPI data transfer mode for reading a response data packet from the multiple-byte buffer; and a process completion process responsive in the enhanced-ACPI data transfer mode and generating a single interrupt at completion of an enhanced-ACPI data transfer mode command.

4. A computer system according to claim 3 wherein:
the read/write data byte process is responsive to either deassertion of an input buffer full bit or and interrupt request signal.

5. A computer system according to claim 3 further comprising:
a standard-ACPI mode sleep process alternating with the read/write data byte process and repeating each byte and resulting in an interrupt per byte.

6. A computer system according to claim 1 further comprising:
an embedded controller process executable in the embedded controller and including a combined standard-ACPI and enhanced-ACPI data transfer control process, the embedded controller process further including:

an interrupt service routine responsive to a command written to a standard command register;

a read status register process for determining whether the data transfer is a standard-ACPI data transfer control process or an enhanced-ACPI data transfer control process;

a read command register process for determining a data transfer operation requested by the processor; and an interrupt request process responsive to a determination that the data transfer is a standard-ACPI data transfer control process for generating an interrupt request directed to the processor.

7. A computer system comprising:
a processor;
a host bus coupled to the processor;
an embedded controller coupled to the processor via the host bus, the embedded controller including a buffer and control logic controlling transfer data bytes via the buffer byte-by-byte and monitoring a buffer full bit at the transfer of each byte;

a local bus coupled to the embedded controller;
a device coupled to the embedded controller via the local bus;

an extended interface coupled to the processor via the host bus and coupled to the device and the embedded controller via the local bus, the extended interface including a multiple-byte buffer;

an extended control logic coupled to the embedded controller, the extended control logic controlling the embedded controller and the extended interface to transfer a plurality of data bytes for a single monitoring of the buffer full bit;

an embedded controller process executable in the embedded controller and including a combined standard-ACPI and enhanced-ACPI data transfer control process, the embedded controller process further including:

an interrupt service routine responsive to a command written to a standard command register;

a read status register process for determining whether the data transfer is a standard-ACPI data transfer control process or an enhanced-ACPI data transfer control process;

a read command register process for determining a data transfer operation requested by the processor;

an interrupt request process responsive to a determination that the data transfer is a standard-ACPI data transfer control process for generating an interrupt request directed to the processor;

a read buffer length process responsive to a determination that the data transfer is an enhanced-ACPI data transfer control process for reading a buffer length from the multiple-byte buffer;

a read data packet process responsive in the enhanced-ACPI data transfer control process for reading a data packet from the multiple-byte buffer;

a processing process responsive to the read data packet process for executing the received enhanced-ACPI command;

a write response data packet process responsive to the processing process for writing result data from executing the received enhanced-ACPI command to the multiple-byte buffer;

a write response status byte responsive to the write response data packet process for writing a response status to a data register; and an interrupt request process responsive to the write response status byte process for generating an interrupt request directed to the processor.

8. A computer system comprising:
a processor;
a host bus coupled to the processor;
an embedded controller coupled to the processor via the host bus, the embedded controller including a buffer and control logic controlling transfer data bytes via the buffer byte-by-byte and monitoring a buffer full bit at the transfer of each byte;

a local bus coupled to the embedded controller;
a device consoled to the embedded controller via the local bus;

an extended interface coupled to the processor via the host bus and coupled to the device and the embedded controller via the local bus, the extended interface including a multiple-byte buffer;

an extended control logic coupled to the embedded controller, the extended control logic controlling the embedded controller and the extended interface to transfer a plurality of data bytes for a single monitoring of the buffer full bit;

an embedded controller process executable in the embedded controller and including a combined standard-ACPI and enhanced-ACPI data transfer control process, the embedded controller process further including:

an interrupt service routine responsive to a command written to a standard command register;

a read status register process for determining whether the data transfer is a standard-ACPI data transfer control process or an enhanced-ACPI data transfer control process;

a read command register process for determining a data transfer operation requested by the processor;

a read buffer length process responsive to a determination that the data transfer is an enhanced-ACPI data transfer control process for reading a buffer length from the multiple-byte buffer;

a read data packet process responsive in the enhanced-ACPI data transfer control process for reading a data packet from the multiple-byte buffer;

a processing process responsive to the read data packet process for executing the received enhanced-ACPI command;

a write response data packet process responsive to the processing process for writing result data from executing the received enhanced-ACPI command to the multiple-byte buffer;

a write response status byte responsive to the write response data packet process for writing a response status to a data register; and an interrupt request process responsive to the write response status byte process for generating an interrupt request directed to the processor.

9. A computer system according to claim 1 wherein: the control logic is a programmed machine code implementation in firmware.

10. A computer system according to claim 1 wherein: the control logic is a programmable machine code implementation in a modifiable storage.

11. A computer system according to claim 1 wherein: the control logic is a circuit implementation.

12. A computer system according to claim 1 wherein: the enhanced control logic is a programmed machine code implementation in firmware.

13. A computer system according to claim 1 wherein: the enhanced control logic is a programmable machine code implementation in a modifiable storage.

14. A computer system according to claim 1 wherein: the enhanced control logic is a circuit implementation.

15. A computer program product comprising: a computer usable medium having computable readable code embodied therein including the control logic and the enhanced control logic according to claim 1.

16. An interface in a computer system including a processor and a device coupled to the processor via a host bus and a local bus comprising:

an embedded controller connectable to the processor via the host bus and connectable to the device via the local bus;

an enhanced interface coupled to the embedded controller via the local bus, connectable to the processor via the host bus, and connectable to the device via the local bus, the enhanced interface including a multiple-byte buffer; and a control logic coupled to the embedded controller including:

a first logic for transferring commands, messages, and data between the processor and the device in a byte-by-byte transfer, each byte being transferred in conjunction with an interrupt; and a second logic for transferring multiple bytes of the commands, messages, and data between the processor and the device via the multiple-byte buffer so that multiple bytes are transferred per interrupt, the processor being capable of loading data into the multiple-byte buffer, sending a transaction command to the control logic, and waiting for the commanded transaction to complete, the control logic controlling execution of the transaction.

17. An interface according to claim 16 wherein:

the first logic transfers the commands, messages, and data according to an Advanced Configuration and Power Interface (ACPI) specification; and the second logic transfers multiple bytes using an ACPI-compliant transfer technique.

18. An interface according to claim 16 wherein the enhanced interface further comprises:

a first unidirectional multiple-byte buffer for transferring commands, messages, and data from the processor to the device; and a second unidirectional multiple-byte buffer for transferring commands, messages, and data from the device to the processor.

19. An interface according to claim 18 wherein the enhanced interface further comprises:

a control register; and a status register.

20. A method of transferring data within a computer system including a processor, a host bus coupled to the processor, an embedded controller coupled to the processor via the host bus and including a buffer and a control logic, a local bus coupled to the embedded controller, a device coupled to the embedded controller via the local bus, and an extended interface coupled to the processor via the host bus and coupled to the device and the embedded controller via the local bus, the extended interface including a multiple-byte buffer, the method comprising:

controlling transfer of data bytes via the buffer byte-by-byte;

monitoring a buffer full bit at the transfer of each byte;

controlling the embedded controller and the extended interface to transfer a plurality of data bytes for a single monitoring of the buffer full bit, including:

loading data into the multiple-byte buffer;

sending a transaction command to the control logic; and waiting for the commanded transaction to complete, the control logic controlling execution of the transaction.

21. A method according to claim 20 wherein:

the data byte transfer is in compliance with an Advanced Configuration and Power Interface (ACPI) specification.

22. A computer program for execution on a computer system including a processor, a host bus coupled to the processor, an embedded controller coupled to the processor via the host bus, the embedded controller including a buffer and control logic controlling transfer data bytes via the buffer byte-by-byte and monitoring a buffer full bit at the transfer of each byte, a local bus coupled to the embedded controller, a device coupled to the embedded controller via the local bus, an extended interface coupled to the processor via the host bus and coupled to the device and the embedded controller via the local bus, the extended interface including a multiple-byte buffer, and an extended control logic coupled to the embedded controller, the extended control logic controlling the embedded controller and the extended interface to transfer a plurality of data bytes for a single monitoring of the buffer full bit, the computer program implementing a host process executable in the processor and including a combined standard-ACPI and enhanced-ACPI data transfer control process, the computer program comprising:

a process for writing a data packet including a plurality of data bytes to the multiple-byte buffer for an enhanced-ACPI data transfer;

an ACPI-compliant process for writing a command code to a standard command register;

a sleep process for temporarily terminating execution awaiting a wakeup signal;

a read/write data byte process responsive in the standard-ACPI data transfer control process to an interrupt request for reading/writing data from/to a data register in response to a wakeup signal;

a read response status process responsive in the enhanced-ACPI data transfer mode to an interrupt request for reading a response status from a data register;

a read response data process responsive in the enhanced-ACPI data transfer mode for reading a response data packet from the multiple-byte buffer; and a process completion process responsive in the enhanced-ACPI data transfer mode and generating a single interrupt at completion of a enhanced-ACPI data transfer mode command.

23. A computer program product comprising:

a computer usable medium having computable readable code embodied therein including the computer program according to claim 22.

24. A computer program for execution on a computer system including a processor, a host bus coupled to the processor, an embedded controller coupled to the processor via the host bus, the embedded controller including a buffer and control logic controlling transfer data bytes via the buffer byte-by-byte and monitoring a buffer full bit at the transfer of each byte, a local bus coupled to the embedded controller, a device coupled to the embedded controller via the local bus, an extended interface coupled to the processor via the host bus and coupled to the device and the embedded controller via the local bus, the extended interface including a multiple-byte buffer, an extended control logic coupled to the embedded controller, the extended control logic controlling the embedded controller and the extended interface to transfer a plurality of data bytes for a single monitoring of the buffer full bit, and an embedded controller process executable in the embedded controller, the computer program implementing a combined standard-ACPI and enhanced-ACPI data transfer control process comprising:

an interrupt service routine responsive to a command written to a standard command register;

a read status register process for determining whether the data transfer is a standard-ACPI data transfer control process or an enhanced-ACPI data transfer control process;

a read command register process for determining a data transfer operation requested by the processor;

an interrupt request process responsive to a determination that the data transfer is a standard-ACPI data transfer control process for generating an interrupt request directed to the processor;

a read buffer length process responsive to a determination that the data transfer is an enhanced-ACPI data transfer control process for reading a buffer length from the multiple-byte buffer;

a read data packet process responsive in the enhanced-ACPI data transfer control process for reading a data packet from the multiple-byte buffer;

a processing process responsive to the read data packet process for executing the received enhanced-ACPI command;

a write response data packet process responsive to the processing process for writing result data from executing the received enhanced-ACPI command to the multiple-byte buffer;

a write response status byte responsive to the write response data packet process for writing a response status to a data register; and an interrupt request process responsive to the write response status byte process for generating an interrupt request directed to the processor.

25. A computer program product comprising:

a computer usable medium having computable readable code embodied therein including the computer program according to claim 24.

26. A computer program for execution on a computer system including a processor, a host bus coupled to the processor, an embedded controller coupled to the processor via the host bus, the embedded controller including a buffer and control logic controlling transfer data bytes via the buffer byte-by-byte and monitoring a buffer full bit at the transfer of each byte, a local bus coupled to the embedded controller, a device coupled to the embedded controller via the local bus, an extended interface coupled to the processor via the host bus and coupled to the device and the embedded controller via the local bus, the extended interface including a multiple-byte buffer, an extended control logic coupled to the embedded controller, the extended control logic capable of controlling the embedded controller and the extended interface to transfer a plurality of data bytes for a single monitoring of the buffer full bit, the computer program implementing an embedded controller process executable in the embedded controller and including a combined standard-ACPI and enhanced-ACPI data transfer control process, the computer program comprising:

an interrupt service routine responsive to a command written to a standard command register;

a read status register process for determining whether the data transfer is a standard-ACPI data transfer control process or an enhanced-ACPI data transfer control process;

a read command register process for determining a data transfer operation requested by the processor;

a read buffer length process responsive to a determination that the data transfer is an enhanced-ACPI data transfer control process for reading a buffer length from the multiple-byte buffer;

a read data packet process responsive in the enhanced-ACPI data transfer control process for reading a data packet from the multiple-byte buffer;

a processing process responsive to the read data packet process for executing the received enhanced-ACPI command;

a write response data packet process responsive to the processing process for writing result data from executing the received enhanced-ACPI command to the multiple-byte buffer;

a write response status byte responsive to the write response data packet process for writing a response status to a data register; and an interrupt request process responsive to the write response status byte process for generating an interrupt request directed to the processor.

27. A computer program product comprising:

a computer usable medium having computable readable code embodied therein including the computer program according to claim 26.

* * * * *